(12) United States Patent
Zamalis et al.

(10) Patent No.: US 7,565,918 B2
(45) Date of Patent: Jul. 28, 2009

(54) VARIABLE ORIFICE ROTARY CONTROL VALVE

(75) Inventors: Michael Hemi Zamalis, York, PA (US); Paul William Snell, York, PA (US)

(73) Assignee: Johnson Controls Technology Company, Holland, MI (US)

( * ) Notice: Subject to any disclaimer, the term of this patent is extended or adjusted under 35 U.S.C. 154(b) by 249 days.

(21) Appl. No.: 11/457,540

(22) Filed: Jul. 14, 2006

(65) Prior Publication Data

US 2008/0011973 A1    Jan. 17, 2008

(51) Int. Cl.
G05D 7/01 (2006.01)
(52) U.S. Cl. .............................. 138/46; 251/209; 138/45
(58) Field of Classification Search ......... 251/205–209, 251/304, 308, 4, 6, 309; 138/45, 46
See application file for complete search history.

(56) References Cited

U.S. PATENT DOCUMENTS

| | | | | |
|---|---|---|---|---|
| 1,437,423 | A | * | 12/1922 | Jackson ..................... 48/189.4 |
| 1,839,672 | A | * | 1/1932 | Hamon ........................ 251/205 |
| 2,067,346 | A | | 1/1937 | Rovinsky |
| 2,740,635 | A | * | 4/1956 | O'Toole ....................... 279/36 |
| 3,443,793 | A | | 5/1969 | Hulsey |
| 3,558,100 | A | | 1/1971 | Hulsey |
| 4,131,128 | A | | 12/1978 | Gotzenberger |
| 4,665,946 | A | | 5/1987 | Hulsey |
| 4,802,506 | A | | 2/1989 | Aslanian |
| 5,108,075 | A | | 4/1992 | Downard et al. |
| 5,218,984 | A | | 6/1993 | Allen |
| 5,370,154 | A | | 12/1994 | Greer |
| 5,573,223 | A | * | 11/1996 | Kawabe .......................... 251/4 |
| 5,601,651 | A | | 2/1997 | Watabe |
| 5,950,664 | A | | 9/1999 | Battaglia |
| 6,712,040 | B1 | * | 3/2004 | Giffin ......................... 123/336 |
| 6,726,175 | B1 | | 4/2004 | Saba et al. |
| 6,808,162 | B2 | | 10/2004 | Tranovich et al. |
| 6,957,798 | B1 | * | 10/2005 | Schmidt ......................... 251/6 |
| 7,322,556 | B2 | * | 1/2008 | Bernstein ....................... 251/6 |

FOREIGN PATENT DOCUMENTS

EP    0 454 336 A2    10/1991

* cited by examiner

Primary Examiner—John K Fristoe, Jr.
Assistant Examiner—Marina Tietjen
(74) Attorney, Agent, or Firm—McNees Wallace & Nurick, LLC

(57) ABSTRACT

A rotary control valve is provided. The valve includes a valve body having a first valve member with a first volute formed therein, wherein the first volute further includes a plurality of flow channels of varying diameter or a single flow channel having a generally smooth gradient from large to small diameter; and a second valve member in close proximity to or in direct contact with the first valve member with a second volute formed therein, wherein the second volute further includes a plurality of flow channels of varying diameter or a single flow channel having a generally smooth gradient from large to small diameter. The first and second volutes cooperate with one another to form an orifice between the first and second valve members, and the diameter of the orifice is variable based on the positions of the individual flow channels relative to one another. Also included are means for axially rotating the first and second valve members in opposite directions relative to one another for varying the size of the orifice formed between the valve members.

25 Claims, 3 Drawing Sheets

VARIABLE ORIFICE ROTARY CONTROL VALVE

BACKGROUND OF THE INVENTION

The described invention relates in general to control valves for use in industrial and commercial processes, and more specifically to a rotary control valve that includes two rotating valve members each having a volute portion formed therein that further includes a plurality of flow channels that create a variable orifice between the valve members as the valve members rotate.

Process plants typically include numerous control loops networked together to produce a product. Each control loop is designed to maintain an important process variable, e.g. pressure, flow, level, temperature, etc. within a required operating range. Each of these loops receives and may create internal load disturbances that can detrimentally affect process variables. To reduce the impact of such load disturbances, sensors and transmitters may be used to collect information about the process variable and its relationship to a desired set point. The collected information is processed by a system controller, which then directs a control element to correct or compensate for the detected disturbance. A common control element utilized for this purpose is the control valve. Control valves typically manipulate a flowing material, such as gas, steam, water, or chemical composition to compensate for a detected load disturbance and keep the process variable close to or at the desired set point.

Numerous control valves are known and used in many different industrial and commercial processes. While generally effective for their intended purpose, many of these valves are not suited for applications requiring variable regulation or control based on certain system conditions and requirements. Thus, there is a need for a control valve that may be used in situations that require variable flow to regulate one or more processes.

SUMMARY OF THE INVENTION

The following provides a summary of exemplary embodiments of the present invention. This summary is not an extensive overview and is not intended to identify key or critical aspects or elements of the present invention or to delineate its scope.

In accordance with one aspect of the present invention, a rotary control valve system is provided. This system includes a housing and a valve body enclosed within the housing. The valve body further includes a first valve member having a first volute formed therein, wherein the first volute further includes a either plurality of flow channels of varying diameter or a single flow channel having a generally smooth gradient from large to small diameter; a second valve member in close proximity to, or in direct contact with, the first valve member having a second volute formed therein, wherein the second volute further includes a plurality of flow channels of varying dimensions. The first and second volutes cooperate with one another to form an orifice between the first and second valve members, and wherein the diameter of the orifice is variable based on the positions of the individual flow channels relative to one another. This system also includes: a drive mechanism, wherein the drive mechanism further includes means for axially rotating the first and second control members in opposite directions relative to one another for varying the dimensions of the orifice formed between the control members; a source of power in communication with the drive mechanism; and a system controller.

In accordance with another aspect of the present invention, a rotary control valve is provided. This valve includes a valve body that further includes: a first valve member having a first volute formed therein, wherein the first volute further includes a plurality of flow channels of varying dimensions (e.g., diameter and depth) or a single flow channel having a generally smooth gradient from large to small diameter; and a second valve member in close proximity to, or in direct contact with, the first valve member having a second volute formed therein, wherein the second volute further includes a plurality of flow channels of varying dimensions or a single flow channel having a generally smooth gradient from relatively large to relatively small diameter. The first and second volutes cooperate with one another to form an orifice between the first and second valve members, and the dimensions of the orifice are variable based on the positions of the individual flow channels forming the orifice. This valve also includes means for axially rotating the first and second valve members in opposite directions relative to one another for varying the dimensions of the orifice formed between the valve members.

In yet another aspect of this invention, a method for making a rotary valve system is provided. This method includes manufacturing a valve body, wherein the valve body further includes a first valve member having a first volute formed therein, wherein the first volute further includes a plurality of flow channels of varying diameter or a single flow channel having a generally smooth gradient from large to small diameter; and a second valve member in close proximity to, or in direct contact with, the first valve member having a second volute formed therein, wherein the second volute further includes a plurality of flow channels of varying dimensions or a single flow channel having a generally smooth gradient from relatively large to relatively small diameter. The first and second volutes cooperate with one another to form an orifice between the first and second valve members, and wherein the diameter of the orifice is variable based on the dimensions of the individual flow channels forming the orifice. This method also includes connecting the valve body to means for axially rotating the first and second valve members in opposite directions relative to one another for varying the dimensions of the orifice formed between the valve members.

The present invention provides certain advantages over existing valve designs and systems. More specifically, the dual-cylinder rotary control valve described herein provides a means by which the volume of gas, fluid, or other material flowing through valve may be varied or graded to be consistent with the operating parameters of a particular system or for a particular application. Additional features and aspects of the present invention will become apparent to those of ordinary skill in the art upon reading and understanding the following detailed description of the exemplary embodiments. As will be appreciated, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
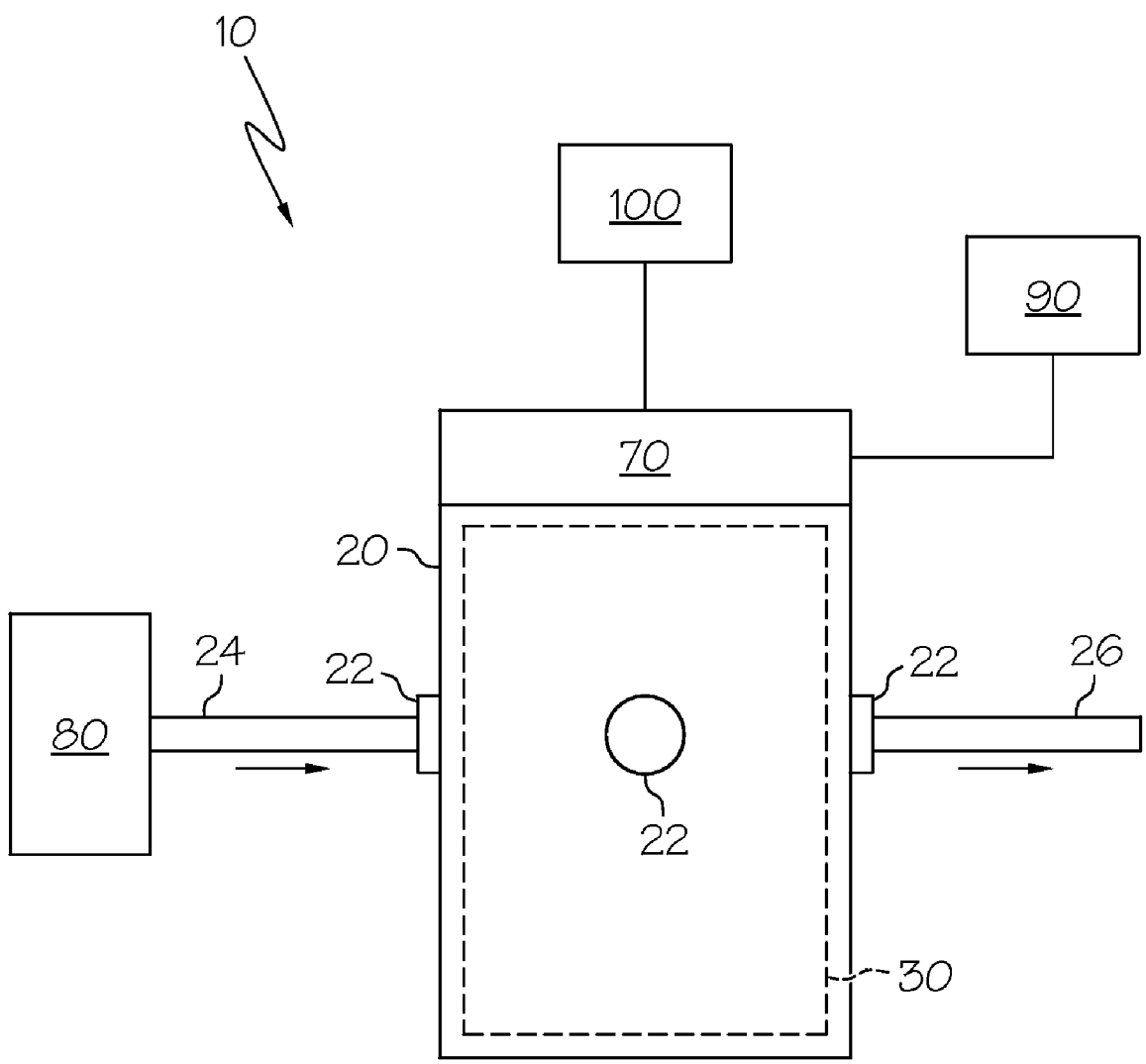
FIG. 1 is a simplified schematic representation of an exemplary embodiment of the rotary control valve system of the present invention.

Exemplary embodiments of the present invention are now described with reference to the Figures. Reference numerals are used throughout the detailed description to refer to the various elements and structures. In other instances, well-known structures and devices are shown in block diagram form for purposes of simplifying the description. Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

The present invention provides a rotary control valve system that includes a rotary control valve having an orifice of variable dimensions formed therein. In an exemplary embodiment, the body of the valve includes two separate, substantially parallel cylinders that function in combination with one another to regulate the flow of gas, fluid, or other material(s) through the valve. Each individual cylinder includes a volute-like cutout portion, the centerline of which runs circumferentially across the surface of the cylinder. Each volute-like cutout portion includes either a series of flow channels, each of which is wider or narrower than the channel to which it is immediately adjacent, or single flow channel having a generally smooth gradient from relatively large to relatively small diameter. Within the body of the valve, in an exemplary embodiment, the cylinders are tangentially mounted in a lengthwise orientation. In this orientation, the flow channels or gradient portion of the first volute are situated adjacent to the corresponding flow channels or gradient portion in the second volute to form a variable orifice between the two cylinders as the cylinders rotate relative to one another. When the valve is in operation, the two cylinders rotate about their respective lengthwise axes in opposite directions such that the flow of gas or fluid through valve is increased or decreased based on the changing size of the orifice formed between the two cylinders.

With reference now to the Figures, FIG. 1 provides a highly simplified schematic representation of an exemplary embodiment of the rotary control valve system of the present invention. In FIG. 1, system 10 includes housing 20; valve body 30; drive mechanism 70, source of material 80, source of power 90, and a system controller 100. Valve body 30 may be enclosed within housing 20, which is typically a cast or welded component that is bolted or otherwise held between two flanges and/or pipes (i.e., input/output flow lines). Housing 20 may include a plurality of bores 22, which are typically in-line with one another on opposite sides of the housing and/or are perpendicular to one another on adjacent sides of the housing. Input flow line 24 connects the housing 20 and valve body 30 to source of material 80, which may be liquid, gas, or other material. Output flow line 26 provides a path for material 80, the flow volume and/or rate of which has been up or down regulated by valve body 30, to pass out of housing 20. The housing may be capped with a lid or other structure that contains drive mechanism 70, which may include a stepper motor, separate actuator, threaded rod and motor combination, or other means for axially rotating certain components of valve body 30 in opposite directions relative to another. Source of power 90 is typically electrical power, although other power sources may be utilized by system 10. System controller 100 controls the drive mechanism 70, and is typically a microprocessor, although other system controllers are compatible with system 10.

Figure 2:
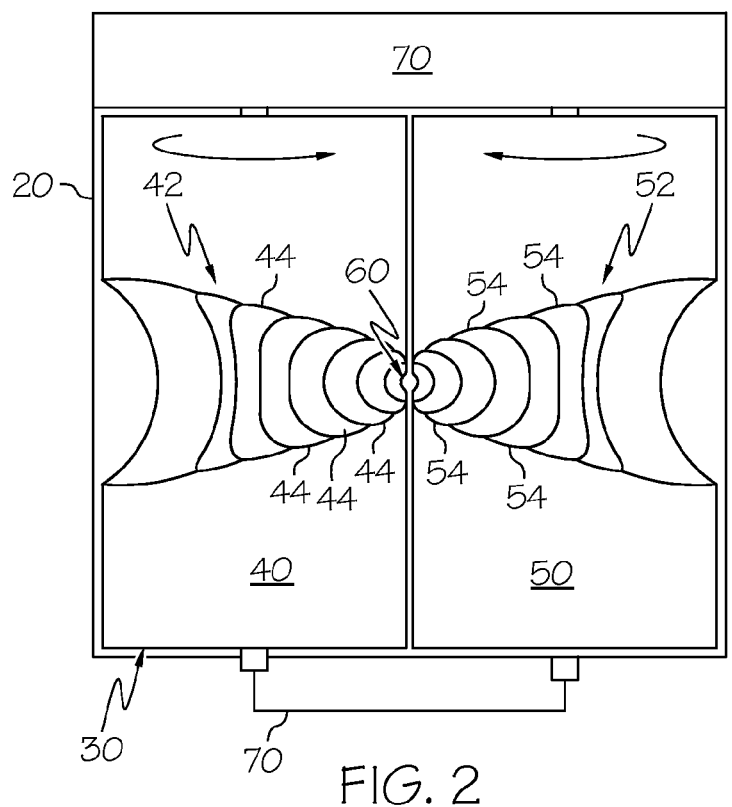
FIG. 2 is a simplified side-view of an exemplary embodiment of the rotary control valve assembly of the present invention.
Figure 3:
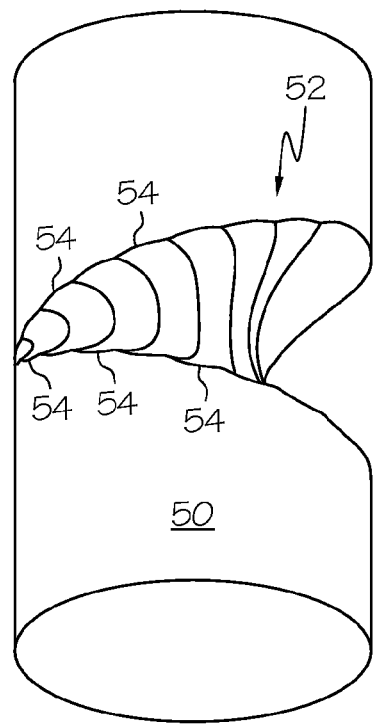
FIG. 3 is a bottom perspective view of one of the valve members of an exemplary embodiment of the rotary control valve of the present invention showing the volute geometry and the flow channels formed therein.

As best shown in FIGS. 2-3, an first exemplary valve body 30 includes a first valve member 40 and a second valve member 50, each of which are substantially cylindrical in shape. Each valve member includes a wedged-shaped cutout portion that generally functions as a volute or volute-like feature. Thus, first valve member 40 further includes first volute 42 and second valve member 50 further includes second volute 52. As shown in FIG. 2, first volute 42 is basically a mirror image of second volute 52. A plurality of flow channels 44 have been machined into or otherwise formed in first volute 42 and a plurality of flow channels 54 have been machined into or otherwise formed in second volute 52. As shown in the Figures, each flow channel is of a greater or lesser size, i.e., diameter and depth, than the flow channel to which it is immediately adjacent. When the valve members are brought into close proximity to one another, or are made to touch one another lengthwise along one edge of each valve member, flow channels 44 and flow channels 54 align to form orifice 60. Proper alignment of the flow channels places the smallest flow channel 44 on first valve member 40 immediately adjacent to the smallest flow channel 54 on second valve member 50. By axially rotating first valve member 40 and second valve member 50 in opposite directions, the diameter of orifice 60 will increase or decrease based on the positions of the flow channels relative to one another. Thus, the diameter of orifice 60, though which gas, liquid, or other material flows, is variable based on the operation of valve body 30 as controlled by system controller 100 or by other means. By gradually varying the size of orifice 60, the flow of liquid, gas, or other material through valve body 30 may be increased or decreased in a predictable and controllable manner.

Figure 4:
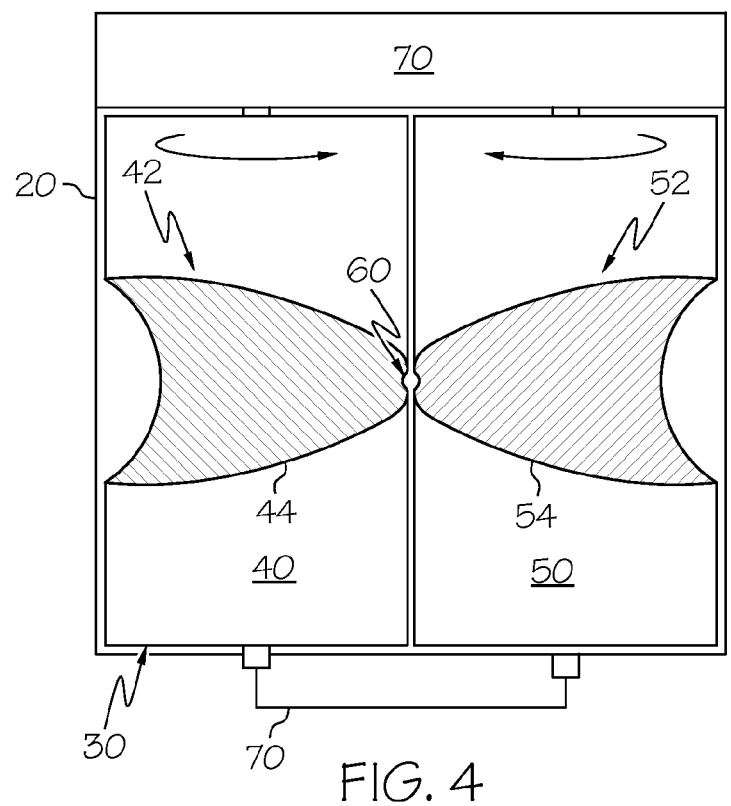
FIG. 4 is a simplified side-view of a second exemplary embodiment of the rotary control valve assembly of the present invention.
Figure 5:
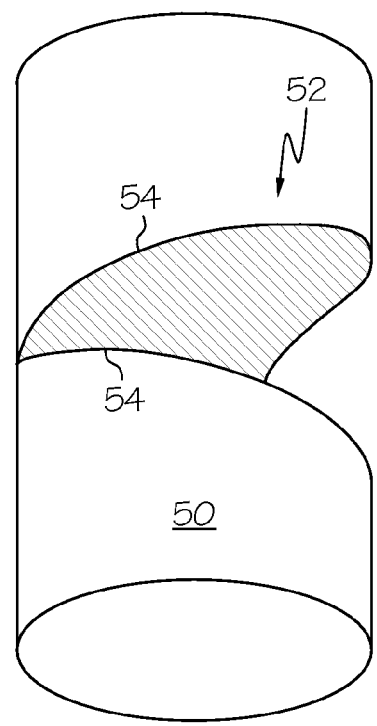
FIG. 5 is a bottom perspective view of one of the valve members of a second exemplary embodiment of the rotary control valve of the present invention showing the volute geometry and the flow channel formed therein.

As best shown in FIGS. 4-5, a second exemplary valve body 30 includes a first valve member 40 and a second valve member 50, each of which are substantially cylindrical in shape. Each valve member includes a wedged-shaped cutout portion that generally functions as a volute or volute-like feature. Thus, first valve member 40 further includes first volute 42 and second valve member 50 further includes second volute 52. As shown in FIG. 4, first volute 42 is basically a mirror image of second volute 52. A single, relatively smooth gradient flow channel has been machined into or otherwise formed in first volute 42 and a single, relatively smooth gradient flow channel has been machined into or otherwise formed in second volute 52. When the valve members are brought into close proximity to one another, or are made to touch one another lengthwise along one edge of each valve member, flow channel 44 and flow channel 54 align to form orifice 60. Proper alignment of the flow channels places the smallest portion (i.e., smallest diameter) of flow channel 44 on first valve member 40 immediately adjacent to the smallest portion (i.e., smallest diameter) of flow channel 54 on second valve member 50. By axially rotating first valve member 40 and second valve member 50 in opposite directions, the diameter of orifice 60 will increase or decrease based on the positions of the flow channels relative to one another. Thus, the diameter of orifice 60, though which gas, liquid, or other material flows, is variable based on the operation of valve body 30 as controlled by system controller 100 or by other means. By gradually varying the size of orifice 60, the flow of liquid, gas, or other material through valve body 30 may be increased or decreased in a predictable and controllable manner.

As will be appreciated by those skilled in the art, the components of system 10 may be manufactured or fabricated using known manufacturing and fabricating techniques, processes, and methods. An exemplary method for making the rotary control valve of the present invention includes the steps of manufacturing valve body 30. Valve body 30 further includes first valve member 40 having first volute 42 formed therein, wherein first volute 42 further includes a plurality of flow channels 44 of varying dimensions or a single flow channel 44 having a generally smooth gradient from large to small diameter; and second valve member 50 in close proximity to, or in direct contact with, a portion of first valve member 40 and having second volute 52 formed therein, wherein second volute 52 further includes a plurality of flow channels 54 of varying diameter or a single flow channel 54 having a generally smooth gradient from large to small diameter. As previously stated, the flow channels formed in first and second volutes 42 and 52 cooperate with one another to form an opening or orifice 60 between first and second valve members 40 and 50 respectively. When the valve is in operation, the diameter of orifice 60 varies based on the positions of the individual flow channels 44 and 54 relative to one another. Valve body 30 is then connected to means 70, e.g., a drive mechanism, which axially rotates, either directly or indirectly, the first and second valve members in opposite directions relative to one another, thereby varying the size of orifice 60, which is formed between the valve members. In alternate embodiments of the present invention, each valve member includes at least one additional volute for allowing system 10 to regulate multiple flow paths.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A rotary control valve system, comprising:
    a housing;
    a valve body enclosed within the housing, wherein the valve body further comprises:
        a first valve member having a first volute formed therein, wherein the first volute further includes a plurality of flow channels of varying dimensions;
        a second valve member in close proximity to the first valve member having a second volute formed therein, wherein the second volute further includes a plurality of flow channels of varying dimensions; and
        wherein the first and second volutes cooperate with one another to form a continuously variable concentric, tapered circular orifice between the first and second valve members, wherein the continuously variable concentric, tapered circular orifice is configured to predictably regulate a flow of fluid therethrough, and wherein the dimensions of the continuously variable concentric, tapered circular orifice are continuously variable based on the positions of the individual flow channels relative to one another; and
    a drive mechanism for axially rotating the first and second valve members in opposite directions relative to one another for varying the dimensions of the orifice formed between the valve members;
    a source of power in communication with the drive mechanism; and
    a system controller for controlling the drive mechanism.

2. The rotary control valve system of claim 1, further comprising: at least two flow lines in communication with the housing.

3. The rotary control valve system of claim 1, further comprising a source of gas in communication with at least one of the housing and valve body.

4. The rotary control valve system of claim 1, further comprising a source of liquid in communication with at least one of the housing and valve body.

5. The rotary control valve system of claim 1, where in the housing further includes a plurality of bores formed therein, and wherein the bores are in-line with one another on opposite sides of the housing.

6. The rotary control valve system of claim 1, where in the housing further includes a plurality of bores formed therein, and wherein the bores are perpendicular to one another on adjacent sides of the housing.

7. The rotary control valve system of claim 1, wherein the first and second valve members are substantially cylindrical in shape, and wherein the first and second valve members are oriented parallel to one another within the housing.

8. The rotary control valve system of claim 7, wherein the first and second valve members are tangentially mounted within the housing in a lengthwise orientation.

9. The rotary control valve system of claim 1, wherein the centerline of the first volute runs circumferentially across the surface of the first valve member, and wherein the centerline of the second volute runs circumferentially across the surface of the second valve member.

10. The rotary control valve system of claim 1, wherein the drive mechanism is selected from the group consisting of a stepper motor, separate actuator, and threaded rod and motor combination.

11. A rotary control valve, comprising:
    a valve body, wherein the valve body further includes:
        a first valve member having at least a first volute formed therein, wherein the first volute further includes a plurality of flow channels of varying dimensions;
        a second valve member in close proximity to the first valve member having a at least a second volute formed therein, wherein the second volute further includes a plurality of flow channels of varying dimensions; and
        wherein the first and second volutes cooperate with one another to form a continuously variable concentric, tapered circular orifice between the first and second valve members, wherein the continuously variable concentric, tapered circular orifice is configured to predictably regulate a flow of fluid therethrough, and wherein the dimensions of the continuously variable concentric, tapered circular orifice are continuously variable based on the dimensions of the individual flow channels forming the orifice; and a drive mechanism for rotating the first and second valve members relative to one another for varying the size of the orifice formed between the valve members.

12. The rotary control valve of claim 11, further comprising a housing in which the valve body is at least partially enclosed.

13. The rotary control valve of claim 11, wherein the housing further includes a plurality of bores formed therein, and wherein the bores are in-line with one another on opposite sides of the housing.

14. The rotary control valve of claim 11, wherein the housing further includes a plurality of bores formed therein, and wherein the bores are perpendicular to one another on adjacent sides of the housing.

15. The rotary control valve of claim 11, wherein the first and second valve members are substantially cylindrical in shape, and wherein the first and second valve members are oriented parallel to one another within the housing.

16. The rotary control valve of claim 15, wherein the first and second valve members are tangentially mounted within the housing in a lengthwise orientation.

17. The rotary control valve of claim 11, wherein the centerline of the first volute runs circumferentially across the surface of the first valve member, and wherein the centerline of the second volute runs circumferentially across the surface of the second valve member.

18. The rotary control valve of claim 11, wherein the drive mechanism is selected from the group consisting of a stepper motor, separate actuator, and threaded rod and motor combination.

19. A method for making a rotary valve system, comprising:

manufacturing a valve body, wherein manufacturing the valve body further includes:

forming a first valve member having a first volute formed therein, wherein the first volute further includes of a plurality of flow channels of varying dimensions;

forming a second valve member in close proximity to the first valve member and having a second volute formed therein, wherein the second volute further includes a plurality of flow channels of varying dimensions; and wherein the first and second volutes cooperate with one another to form a continuously variable concentric, tapered circular orifice between the first and second valve members, wherein the continuously variable concentric, tapered circular orifice is configured to predictably regulate a flow of fluid therethrough and wherein the dimensions of the continuously variable concentric, tapered circular orifice are continuously variable based on the positions of the individual flow channels forming the orifice; and connecting the valve body to means for rotating the first and second valve members relative to one another for varying the size of the orifice formed between the valve members.

20. The method of claim 19, further comprising enclosing the valve body within a housing.

21. The method of claim 19, further comprising attaching at least one of the valve body or the housing to at least one input line and at least one output line.

22. The method of claim 19, wherein the first and second valve members are substantially cylindrical in shape, and wherein the first and second valve members are oriented parallel to one another within the housing.

23. The method of claim 22, wherein the first and second valve members are tangentially mounted within the housing in a lengthwise orientation.

24. The method of claim 19, wherein the centerline of the first volute runs circumferentially across the surface of the first valve member, and wherein the centerline of the second volute runs circumferentially across the surface of the second valve member.

25. The method of claim 19, wherein the means for rotating the first and second valve members relative to one another further comprises a drive mechanism selected from the group consisting of a stepper motor, separate actuator, and threaded rod and motor combination.

* * * * *